April 17, 1962 W. P. CHASE 3,030,617

ANALOG-DIGITAL CONVERTER

Filed May 28, 1956 2 Sheets-Sheet 1

INVENTOR.
WALLACE P. CHASE
BY
Theodore H. Lassagne
ATTORNEY

ANALOG-DIGITAL CONVERTER

Filed May 28, 1956

INVENTOR.
WALLACE P. CHASE
BY
Theodore H. Lassagne
ATTORNEY

United States Patent Office 3,030,617

Patented Apr. 17, 1962

3,030,617

ANALOG-DIGITAL CONVERTER

Wallace P. Chase, La Canada, Calif., assignor to General Precision, Inc., a corporation of Delaware Filed May 28, 1956, Ser. No. 587,599
6 Claims. (Cl. 340—347)

The present invention relates to converters for transforming analogue quantities into signals representative of digital numbers. The invention is more particularly concerned with an analogue-to-digital converter which is capable of producing at any instant a series of voltages which represent a multi-digital number. The multi-digital number produced at any instant is adapted to correspond to the position at that instant of a shaft or of any other member representing an analogue quantity.

Digital computers are in wide use at present. These computers have been found to be more accurate than other computers such as those of the analogue type. It is desirable for increased accuracy, therefore, to use a digital computer for the measurement and computation of analogue quantities such as the position of a shaft or, in general, of any movable member. For this purpose, the analogue quantity must be converted into digital information. Instrumentalities for achieving this are referred to in the art as analogue-to-digital converters.

Until recently, attempts to produce completely satisfactory analogue-to-digital converters were not entirely successful. Most of these prior art converters required mechanical switches and other components which rendered the converters unduly large and expensive and prevented them from being reliable under all circumstances. A recent development in the analogue-to-digital converter field is described and claimed in copending application, Serial Number 467,154, filed November 5, 1954, in the name of Leo P. Retzinger, Jr. The converter described in the copending application is an improvement over those previously used in that it requires no movable switching components and is, in general, accurate and inexpensive.

The present invention is concerned with an improved analogue-to-digital converter, which, like the converter described in the copending application referred to above, does not require movable switching elements. The converter of the present invention represents a still further simplification of this type of unit. In general, the invention provides an improved converter that is compact, accurate, reliable and inexpensive. The analogue-to-digital converter of the invention uses a relatively simple control system which may conveniently incorporate transistors and which operates to energize selected ones of a series of output terminals depending upon the digital information passed by the system. The output terminals appear to be energized simultaneously through a series of parallel paths, rather than successively through a single path as is the case in some prior art systems of this type. The reason is that the transistor circuitry included in the invention operates so quickly on a serial basis that the signals appear to be produced simultaneously in a plurality of parallel paths. This enables the digital representation of the analogue quantity to be made relatively quickly. This digital information is supplied to the control system by a movable information member having conductive and non-conductive segments digitally allocated on at least one of its surfaces in rows of different ordinal significance. The information member is movable to a series of different positions representing different analogue quantities.

Figure 1:
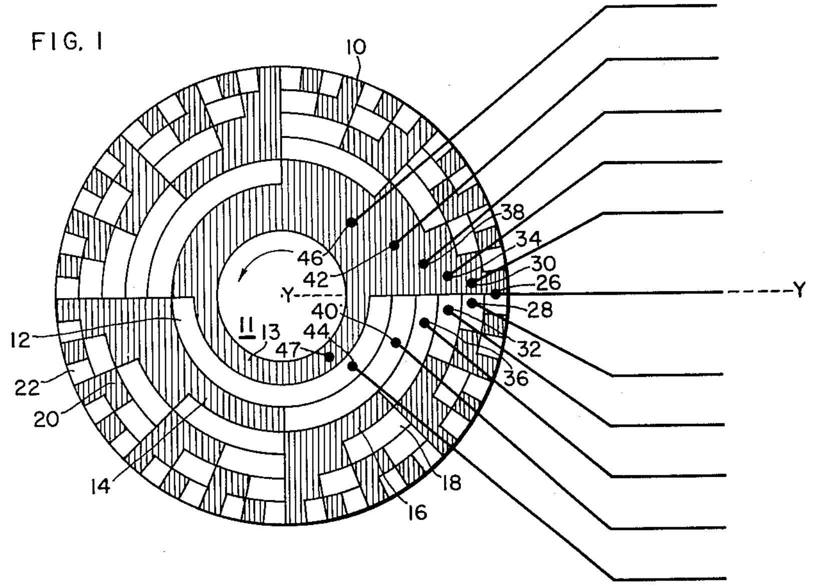
FIGURE 1 is a somewhat schematic diagram illustrating an information member such as a rotatable disc positionable in accordance with the value of an analogue quantity such as the angular position of a shaft and also illustrating a plurality of brushes which selectively contact digitally allocated conductive and non-conductive segments on the information member.

The information member illustrated in FIGURE 1 is in the form of a rotatable disc 10 which is adapted to be mounted on the end of a shaft 11 and in coaxial relation with the shaft so as to be rotatable with the shaft about a common axis. In a manner to be described, the disc 10 assists in the production of digital signals representative of the angular position of the shaft at any particular instant. It should be pointed out that other types of information members other than the disc 10 can be used. for example, an information member can be used which is movable linearly to represent linear rather than angular positions.

The disc 10 may be made from a suitable insulating material and is provided with a plurality of electrically conductive arcuate segments formed on at least one of its surfaces. These segments are positioned in each of a series of concentric annular rows 12, 14, 16, 18, 20 and 22. In the drawings, the conductive segments are shown as the shaded areas on the disc. In a manner to be described, the conductive and non-conductive segments are digitally arranged in the various rows, with each row having a different ordinal significance increasing from the rim of the disc toward the center, that is, from the row 22 to the row 12.

The row 12 has a conductive portion or segment extending through an arc of substantially 180°, and it has a nonconductive portion or segment extending through the other 180° of its angular length. The row 14 has two conductive segments and two nonconductive segments all of equal length, with each segment extending through an arc of 90° and each conductive segment being separated by a nonconductive segment. The leading edge of one of the nonconductive segments in the row 14 may be aligned with the leading edge of the nonconductive segment of row 12 (assuming counter-clockwise rotation of the disc 10). However, it should be appreciated that the leading edges of the nonconductive segments in the rows 12 and 14 do not necessarily have to be aligned, as described in detail in copending application Serial Number 489,010 filed by Carl Miller on February 18, 1955.

The row 16 has four conductive segments and four nonconductive segments, each having an angular length of approximately 45°. The conductive and nonconductive segments of row 16 are positioned in alternation. The leading edge of one of the nonconductive segments of the row 15 may be aligned with the leading edge of the nonconductive segment of the row 12. The row 18 has sixteen alternately positioned conductive and nonconductive segments, and each segment has an angular length of approximately 22½°. The leading edge of a nonconductive segment in the row 18 is aligned with the leading edge of the nonconductive segment of the row 12.

Likewise, the row 20 has thirty-two conductive and nonconductive segments of equal lengths, and the row 22 has sixty-four conductive and nonconductive segments of equal lengths. The leading edge of a nonconductive segment in the row 20 and the leading edge of a nonconductive segment in the row 22 are aligned with the leading edge of the nonconductive segment in row 12.

These aligned leading edges of nonconductive segments in each of the rows 12, 14, 16, 18, 20 and 22 may be considered as the zero position on the disc as indicated by the line Y—Y. The disc also has a central row 13 which is concentric with the other rows and which is entirely conductive. The row 13 serves as a convenient connecting means to the disc for purposes to be described.

As represented by the aligned leading edges of the respective nonconductive segments in the rows 12, 14, 16, 18, 20 and 22 and as described above, the zero position of the disc 10 extends along the line Y—Y of FIGURE 1. If a series of stationary conductive brushes are disposed along the line Y—Y in respective engagement with the different rows, 12, 14, 16, 18, 20 and 22 on the disc 10, then the conductive segments will make contact with these brushes in the following sequence as the disc 10 is rotated in a counter-clockwise direction. (The numeral "1" represents a contact between a brush and a conductive segment.

| | Row | | | | | |
|---|---|---|---|---|---|---|
| | 12 | 14 | 16 | 18 | 20 | 22 |
| Position: | | | | | | |
| 1 | 0 | 0 | 0 | 0 | 0 | 1 |
| 2 | 0 | 0 | 0 | 0 | 1 | 0 |
| 3 | 0 | 0 | 0 | 0 | 1 | 1 |
| 4 | 0 | 0 | 0 | 1 | 0 | 0 |
| 5 | 0 | 0 | 0 | 1 | 0 | 1 |
| 6 | 0 | 0 | 0 | 1 | 1 | 0 |
| 7 | 0 | 0 | 0 | 1 | 1 | 1 |
| 8 | 0 | 0 | 1 | 0 | 0 | 0 |
| * | * | * | * | * | * | * |
| 63 | 1 | 1 | 1 | 1 | 1 | 1 |

Then, in the illustrated embodiment, if the rows 12, 14, 16, 18, 20 and 22 are arranged in decreasing ordinal significance from the center of the disc 10, the row 22 will represent a digit $2^{\circ}$, the row 20 will represent a digit $2^1$, the row 18 will represent a digit $2^2$ and so on. It is clear, therefore, that the brushes positioned along the line Y—Y will generate a series of voltages corresponding to multi-digital numbers which represent the angular position of the shaft at any instant. It should be clear that the illustrated number of annular rows on the disc 10 is merely by way of example and that a different number of rows can be used depending upon the accuracy desired.

False indications may occur, however, when, as suggested above, a single set of brushes disposed along the line Y—Y is used. Such a false indication may occur, for example, when a brush is intended to contact and read a conductive segment and, in passing the dividing line between that conductive segment and the adjacent nonconductive segment, fails to read the conductive segment. This is not particularly serious in the row 22 of the least digital significance. However, in the row 12 of greatest digital significance such a false indication would produce a material error. To prevent the possibility of false indications, a paired set of brushes is used with each row except the row 22.

The brushes used in the system are stationary elements made from a resilient material having properties of electrical conductivity. These elements are suitably mounted and positioned to engage and wipe at least one face of the rotatable disc 10. The brushes are also positioned respectively to engage the annular rows on the disc 10 and to produce a positive voltage or ground potential whenever a conductive segment in the row is contacted. The brushes may be considered as one form of means for receiving signals from the information member such as the disc, 10.

In the illustrated arrangement, a single brush 26 is associated with the row 22, and two brushes are associated with each of the succeeding rows 20, 18, 16, 14 and 12. A brush 28 and a brush 30 are associated with the row 20. The brush 28 leads the brush 26 for a counter-clockwise direction of rotation of the disc 10 and the brush 30 lags the brush 26 for this direction of rotation. A brush 32 and a brush 34 are associated with the row 18. The brush 32 leads the brush 28 for a counter-clockwise direction of rotation of the disc 10 and the brush 34 lags the brush 30.

In like manner, brushes 36 and 38, brushes 40 and 42 and brushes 44 and 46 are respectively disposed in contiguous relationship to the rows 16, 14 and 12. The brushes 36, 40 and 44 lead the corresponding brushes in the preceding row and the brushes 38, 42 and 46 lag the corresponding brushes in the preceding row in a manner similar to that described in the preceding paragraph. Finally, a brush 47 is associated with the conductive row 13.

Now, again assuming that the disc 10 is in its zero position in FIGURE 1, the aligned leading edges of the nonconductive segments of the rows 12, 14, 16, 18, 20 and 22 will extend along the line Y—Y. For this zero position, the brush 26 is on the leading edge of the nonconductive portion of row 22; the brushes 28, 32, 36, 40 and 44 contact the disc at positions on one side of the line Y—Y; and the brushes 30, 34, 38, 42 and 46 contact the disc 10 at positions on the other side of the line Y—Y in symmetric relation with the positions of their paired brushes 28, 32, 36, 40 and 44.

As indicated above, the brushes 28, 32, 36, 40 and 44 are the leading brushes as the disc rotates in a counter-clockwise direction, and the brushes 30, 34, 38, 42 and 46 are the lagging brushes. Each of the brushes 28, 32, 36, 40 and 44 leads the brush 26 by an angular distance substantially equal to one quarter of the length of each of the conductive and nonconductive segments in the corresponding row. Likewise, each of the brushes 30, 34, 38, 42 and 46 lags the brush 26 by an angular distance substantially equal to one quarter of the length of the conductive and nonconductive segments in its associated row.

As the disc 10 rotates, the conductive and nonconductive segments in each row assume different relationships with the brushes. In the manner described above, the angular rotation is indicated on a digital basis by the positioning of the brushes relative to the conductive and nonconductive segments in their associated rows. Since the conductive and nonconductive segments in the row 22 are shorter than the conductive and nonconductive segments in any other row, the row 22 indicates the binary digit of least significance. In other words, the row 22 indicates value of "$2^0$" or "1." By the same token, the row 20 indicates a value of "$2^1$" or "2", and the row 18 indicates a value of "$2^2$" or "4." Similarly, and as illustrated by the table appearing previously in this specification, each row from the rim to the center of the disc indicates the value of a binary digit in increasing significance.

The value of the binary digit represented by the row 22 at any instant is read by the brush 26 since this is the only brush associated with this row. However, the value of the digit represented by the row 20 is read by the selected one of the two brushes 28 and 30. Similarly, the value of the digit represented by the row 18 is read by the selected one of the brushes 32 and 34 and the value of the digit represented by the row 16 is read by the selected one of the brushes 36 and 38. In like manner, the value of the digit represented by each of the other rows is indicated by the selected one of the brushes in that row.

To preclude false readings, the brush selected in each of rows 12, 14, 16, 18 and 20 must be within the confines of a conductive or nonconductive segment in its corresponding row at the time it is read, and it must not be crossing the border between any such segments. Such a selection will assure that there will be no possibility of a brush reading "0" or a nonconductive segment when it should be reading "1" or a conductive segment, or vice versa. In short, this will assure that there will be no possibility of false or ambiguous indications from any brush except the brush 26. As noted previously, false readings from the brush 26 can be tolerated since it represents the least significant binary digit.

The physical relation between the various brushes may be seen from a particular example such as the brushes associated with the rows 22 and 20. When the brush 26 becomes positioned in contiguous relationship to a particular conductive portion of the row 22, the lagging brush 30 has already become positioned in contacting relationship to a particular conductive or nonconductive segment in the row 20. The lagging brush 30 continues to contact the particular segment in the row 20 for at least as long a time as the brush 30 contacts the particular conductive portion in the row 22. Therefore, the lagging brush 30 in the row 20 should be selected when the brush 26 engages a conductive segment rather than the leading brush 28. This will assure a true indication from the row 20.

On the other hand, when the brush 26 starts to contact a nonconductive segment in the row 22, the leading brush 28 is already contacting the particular conductive or nonconductive segment of the row that is to be read for a true indication of the analogue quantity at that instant. Moreover, the leading brush 28 remains in that segment until after the brush 26 starts to contact the next conductive portion of the row 22. Therefore, the leading brush 28 should be selected whenever the brush 26 engages a nonconductive segment so as to obtain in a true indication of the digit represented in row 20.

Similarly, whenever the selected brush in each row starts to contact a conductive segment, the lagging brush in the row of the next highest ordinal significance has already started to contact the particular conductive or nonconductive segment that is to be read for an indication of the analogue quantity at that instant. Moreover, the lagging brush in each row will continue to contact the particular segment in the row until the conductive segment in the preceding row has moved past the brush selected in that row. Therefore, the lagging brush in the next succeeding row should always be selected for reading whenever the selected brush in a particular row is disposed in contiguous relationship to a conductive segment.

On the other hand, whenever the selected brush in any row is in engagement with a nonconductive segment, the leading brush in the next succeeding row should be selected for reading because it has already started to contact the conductive or nonconductive segment that is to be read for an indication at that instant. The leading brush will continue to engage that segment until the selected brush of the preceding row has started to engage the next conductive segment in the preceding row.

The various conductive and nonconductive segments of the disc 10 can, therefore, be considered as a plurality of switch control means that are digitally allocated on at least one surface of the disc in a series of annular rows of different ordinal significance. These switch control means are adjustable to a series of angular positions respectively representing the digital equivalents of a corresponding series of analogue quantities. The various brushes may be considered as switching means or readout elements that are controlled by the switch control means. The switching means are arranged in steps of different ordinal significance to be engaged by the switch control means. At least two of the switching means are positioned at each such step except that only one switching means is associated with the switch control means representing the digit of least significance. The various brushes may also be considered as receiving means which receive signals from the conductive segments on the disc.

Figure 2:
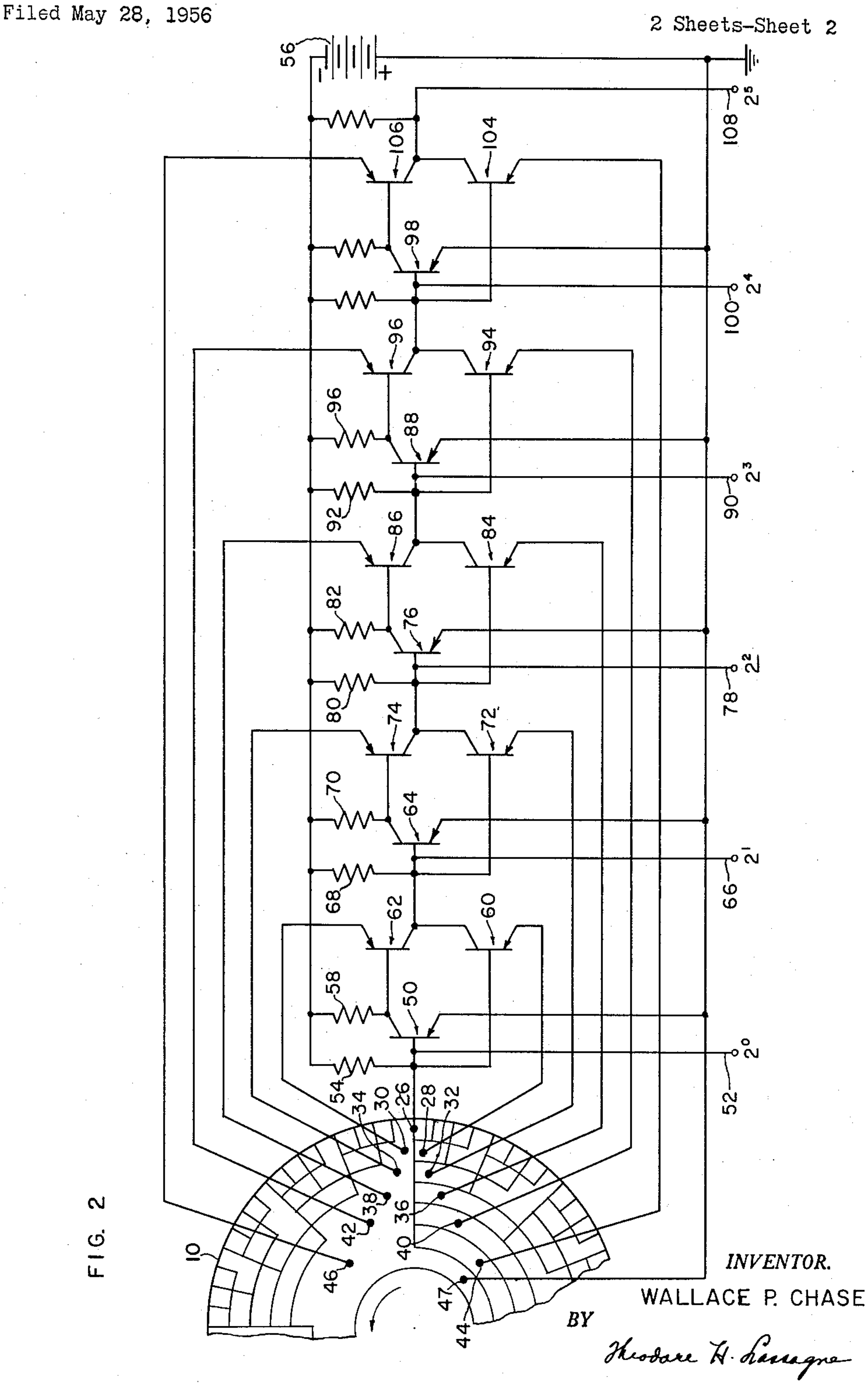
FIGURE 2 is a circuit diagram of an electric control circuit which is connected to the brushes associated with the information member of FIGURE 1 for selecting certain brushes to prevent ambiguities or false readings from occurring and to produce digital signals representative at any instant of the analogue quantity represented by the information member.

The electrical system illustrated in FIGURE 2 is a logical control circuit including a plurality of electronic discharge control devices having a plurality of electrodes with at least one control electrode, wherein the electrodes are fixed or stationary with respect to the electronic discharge control device, which includes such devices as transistors, diodes and other semi-conductors, as well as vacuum tubes and other similar or analogous devices, but does not include such electrical components as relay switching devices which have movable contacts. This logical control circuit is capable of selecting the proper brush from each row in accordance with the pattern described above. The control circuit includes a plurality of output terminals and the brush selected in each row is coupled to a corresponding output terminal in a manner to be described. This causes a plurality of digital signals to be produced across the output terminals so as to indicate a multi-digital number corresponding at any instant to a corresponding analogue quantity.

The brush 26 associated with the row 22 of least ordinal significance on the disc 10 is connected to the base of a transistor 50. The base of this transistor is also connected to a first output terminal 52 and to one terminal of a resistor 54. The other terminal of the resistor 54 is connected to the negative terminal of a source 56 of direct voltage. It should be appreciated that half wave rectifiers and full wave rectifiers may also be used as the source 56 to provide voltage to various members including the resistance 54. The voltage source 56 is adapted to provide a potential of approximately 1.5 volts. The positive terminal of the source 56 is connected to ground and to the brush 47 associated with the conductive row 13 on the disc 10. The emitter of the transistor 50 is connected to the positive terminal of the source 56 and the collector of this transistor is connected to one terminal of a resistor 58, the other terminal of the resistor 58 being connected to the negative terminal of the source 56.

The base of the transistor 50 is also connected to the base of a transistor 60, and the collector of the transistor 50 is connected to the base of a transistor 62. The collectors of the transistors 60 and 62 are connected to the base of a transistor 64. The emitter of the transistor 60 is connected to the leading brush 28 associated with the row 20 of the disc 10, and the emitter of the transistor 62 is connected to the lagging brush 30 associated with that row.

The base of the transistor 64 is connected to an output terminal 66 and to one terminal of a resistor 68. The other terminal of the resistor 68 is connected to the negative terminal of the source 56. The emitter of the transistor 64 is connected to the positive terminal of the source 56 and the collector of this transistor is connected to one terminal of a resistor 70, the other terminal of this resistor being connected to the negative terminal of the source 56.

The base of the transistor 64 is connected to the base of a transistor 72, and the collector of the transistor 64 is connected to the base of a transistor 74. The collectors of the transistors 72 and 74 are connected to the base of a transistor 76. The emitter of the transistor 72 is connected to the leading brush 32 associated with the row 18 of the disc 10, and the emitter of the transistor 74 is connected to the lagging brush 34 in that row.

The base of the transistor 76 is connected to an output terminal 78 and to one terminal of a resistor 80. The other terminal of the resistor 80 is connected to the negative terminal of the source 56. The emitter of the transistor 76 is connected to the positive terminal of the source 56, and the collector of this transistor is connected to a resistor 82. The resistor 82 is in turn connected to the negative terminal of the source 56. The base of the transistor 76 is connected to the base of a transistor 84, and the collector of the transistor 76 is connected to the base of a transistor 86. The collectors of the transistors 84 and 86 are connected together and to the base of a transistor 88. The emitter of the transistor 84 is connected to the leading brush 36 associated with the row 16 of the disc 10, and the emitter of the transistor 86 is connected to the lagging brush 38 of that row. The collectors of the transistors 84 and 86 have a common connection with an output terminal 100.

In like manner, transistors 88, 94 and 96 are included in the circuit and are connected in a manner similar to that described for the transistors 64, 72 and 74 to control the selection of the brushes 38 and 40. An output terminal 100 is connected to the collectors of the transistors 94 and 96 to indicate whether the selected one of the brushes 38 and 40 is contacting a conductive or nonconductive segment in the row 14. The transistors such as the transistors 88, 94 and 96 may be considered as selecting means for activating different ones of the brushes 38 and 40, which may be considered as receiving means. This will become more apparent subsequently.

Transistors 98, 104 and 106 are also connected in the circuit shown in FIGURE 2 in a manner similar to the transistors 64, 72 and 74. Voltages are respectively applied to the emitters of the transistors 104 and 106 from the brushes 44 and 46 such that the transistors can operate to select a particular one of the brushes for activation. Connections are made from the collectors of the transistors 104 and 106 to an output terminal 108 to indicate whether the activated one of the brushes 44 and 46 is contacting a conductive or nonconductive segment in the row 12.

It will be seen from the circuit diagram of FIGURE 2 that each row on the disc 10 has an output terminal associated therewith. For example, the output terminal 52 is associated with the row 22 and the output terminal 66 is associated with the row 20. In like manner, the output terminal 78 is associated with the row 18. It will be realized that there are as many output terminals as there are rows of segments on the disc 10. For discs with a different number of rows, there will be a corresponding number of output terminals and a corresponding number of associated transistor circuits.

For any particular position of the disc 10 a series of voltages or potentials will appear at the terminals 52, 66, 78, 90, 100 and 108 in accordance with the chart, column 3, lines 20 to 33, wherein the binary numeral one representing a contact between a brush and a conductive segment would be indicated by a positive voltage or ground potential and the binary numeral zero representing a contact between a brush and a non-conductive segment would be indicated by a negative voltage or a low potential. Depending on the specific output circuitry and the requirements of associated digital equipment a binary one may also be represented by a small negative potential and a binary zero by much larger negative potential or vice-versa the binary one may be represented by a low potential and the binary zero by a high potential.

The brush 26 causes a current to flow through the resistor 54 to produce a relatively high voltage or ground potential at the terminal 52 whenever the brush 26 contacts a conductive segment. If, however, the brush 26 is contacting a non-conductive segment no current will flow and a negative potential will appear on the terminal 52. Therefore, the high or low potential at terminal 52 will represent the least significant digit of the binary number corresponding to the position of disc 10. As will be described in detail subsequently, the logical control circuit of FIGURE 2 then functions to select one of the two brushes associated with the row 20 so that a high or low voltage will appear at the output terminal 66 representing a binary digit of the next highest ordinal significance or the next most significant digit. In like manner, one of the brushes is selected in each succeeding row on the disc 10 so that high or low voltages will appear at the respective output terminals 78, 90, 100 and 108 respectively to represent binary digits of increasing ordinal significance.

Figure 3:
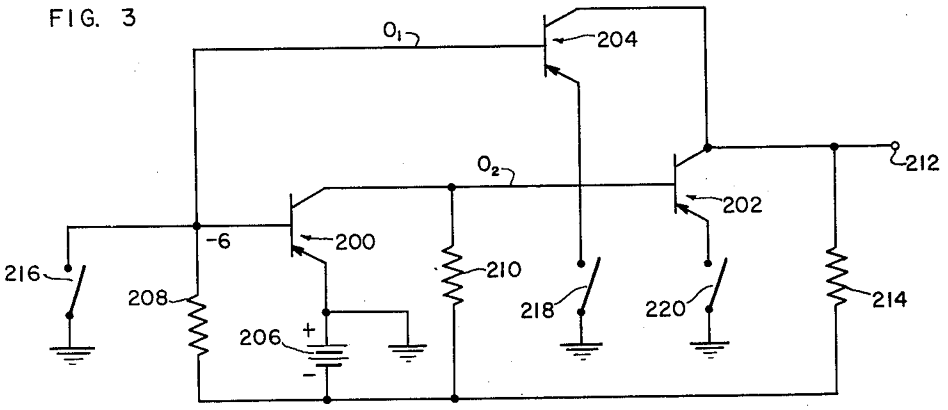
FIG. 3 is a schematic representation of a transistor switching circuit and is useful in explaining the operation of the control circuit of FIGURE 2.

A consideration of the circuit of FIGURE 3 will be helpful in explaining the switching operation of the control circuit of FIGURE 2. The circuit of FIGURE 3 includes a plurality of semi-conductors such as a transistor 200. The transistors such as the transistor 200 may also be considered as selecting means. The transistors such as the transistor 200 and the circuitry associated with the transistors have a stationary operating relationship in that the transistors and the associated circuitry have no moving parts such as result when switches with movable arms are used. The transistors such as the transistor 200 and the associated circuitry may also be considered to have a fixed operating disposition since no moving parts such as the movable arms of the switches are included in the circuitry. The collector of the transistor 200 is connected to the base of a transistor 202, and the base of this transistor 200 is connected to the base of a transistor 204. The emitter of the transistor 200 is grounded, as is the positive terminal of a direct voltage source 206. The base of the transistor 200 also is connected to one terminal of a resistor 208, the other terminal of which is connected to the negative terminal of the source 206. The collector of the transistor 200 is connected to one terminal of a resistor 210, the other terminal of this resistor being connected to the negative terminal of the source 206. The collectors of the transistors 202 and 204 have a common connection with an output terminal 212. This output terminal is connected to one terminal of a resistor 214 having its other terminal connected to the negative terminal of the source 206.

The base of the transistor 200 is connected to one terminal of a switch 216, the other terminal of this switch being grounded. In like manner, the emitter of the transistor 204 has a common connection with one terminal of a switch 218, the other terminal of which is grounded. A connection is made from the emitter of the transistor 202 to one terminal of a switch 220 having the other terminal grounded.

From a comparison of the schematic circuit of FIGURE 3 with portions of the circuit of FIGURE 2, it can be seen that the transistor 200 is connected in a manner similar, for example, to the transistor 50. It can also be seen that the transistors 202 and 204 are connected in a manner similar to the transistors 62 and 60. The closure of the switch 216 is similar to the contacting of the brush 26 with a conductive segment in the row 22 on the disc 10, and the closures of the switches 218 and 220 are respectively equivalent to engagements of the brushes 28 and 30 with a conductive segment in the row 20.

It will be assumed that all the transistors of the system are of the P-N-P type. It will be realized, of course, that N-P-N transistors can be used merely by reversing the polarity of the voltage sources 56 or 206. In the P-N-P type of transistor, the emitter and collector of the transistor have an excess of positive charge or "holes" and the base of the transistor has an excess of electrons. Because of the excess of positive charges in the emitter, the positive charges become attracted toward the base when a negative potential of sufficient amplitude is applied on the base relative to the potential on the emitter.

If the negative potential on the base is of a sufficient magnitude, the positive charges attracted toward the base have a sufficient acceleration imparted to them such that they continue their movement past the base to the collector. This is especially true when a negative potential is applied to the collector to impose an additional force of attraction on the positive charges. In this way, a flow of current is obtained between the emitter and collector of the transistor. Most of the current flows between the emitter and collector of the transistor and relatively little of the current flows between the emitter and the base of the transistor.

When the switch 216 is closed, the base of the transistor 200 is established at ground potential, as is its emitter. Therefore, no current flows through the transistor. The potential of the collector of the transistor 200 is now established at the potential of the negative terminal of the source 206 as no current flows through the resistor 210. The base of the transistor 204 becomes established at the same time at zero or ground potential by the base of the transistor 200 so that current cannot flow through the transistor 204. However, the base of the transistor 202 is biased to the negative potential of the source 206 by the collector of the transistor 200 so that the transistor 202 is conditioned to pass current.

When the switch 216 is open, on the other hand, the base of the transistor 200 is negatively biased relative to the emitter. The base of the transistor 200 is negatively biased through the resistor 208 from the source 206. This causes current to flow from the emitter to the base of the transistor 200. This current flows through the resistor 208 so as to bias the base to a voltage which is less negative than the voltage at the negative terminal of the source 206 but which is negative with respect to ground. The voltage on the base of the transistor 200 is sufficient to produce a flow of current through the transistor 204.

Since the collector of the transistor 200 is negatively biased through the resistor 210 from the source 206, most of the positive charges attracted from the emitter toward the base by the negative potential on the base continue toward the collector. The value of the resistor 210 is so chosen that this current flow establishes the collector of the transistor 200 essentially at zero or ground potential. Therefore, when the switch 216 is open, a negative bias is introduced to the base of the transistor 204 from the base of the transistor 200 to condition the transistor 204 for conduction. However, essentially zero bias is introduced to the base of the transistor 202 from the collector of the transistor 200 to prevent any current from flowing through the transistor 202.

As may be seen from the above discussion, the closure of the switch 218 has no effect on the circuit when the switch 216 is closed. The reason for this is that the base and emitter of the transistor 204 are then both at ground potential so as to prevent the transistor 204 from becoming conductive. Therefore, no current flows through the resistor 214 and no signal appears at the output terminal 212 regardless of the condition of the switch 218.

On the other hand, when the switch 216 is closed and the switch 220 is also closed, the emitter of the transistor 202 is grounded and the base of the transistor is negatively biased. This causes current to flow through the transistor 202 such that the potential on the collector of the transistor rises from a negative value to ground potential. Because of this rise in potential, a positive voltage is produced at the output terminal 212. Therefore, when the switch 216 is closed, the closure of the switch 220 will produce a positive voltage at the output terminal 212.

When the switch 216 is open, however, the base of the transistor 204 is established at the negative potential of the base of the transistor 200. If the switch 218 is closed, a ground potential will be established at the emitter of the transistor 204. Since a negative potential is introduced to the base of the transistor, the difference in potential between the base and emitter of the transistor 204 causes the transistor to become conductive. This causes current to flow through a circuit including the voltage source 206, the switch 218, the transistor 204 and the resistor 214. The current flowing through the resistor 214 causes a positive voltage to be produced at the output terminal 212.

During the time that the switch 216 is open, a potential approaching ground is produced on the collector of the transistor 200 because of the flow of current through the transistor. This potential is introduced to the base of the transistor 202, to prevent any current from flowing through the resistor 214. Therefore, when the switch 216 is open, closing or opening the switch 220 has no effect on the production of a voltage at the output terminal 212, but closing the switch 218 does produce such a voltage.

Equating the operation of the circuit of FIGURE 3 to the control system of FIGURE 2, it will be seen that whenever the brush 26 engages a conductive segment in the row 22, the transistor 62 is conditioned for the flow of current but the transistor 60 is not. This means that the lagging brush 30 of the row 20 is selected, rather than the leading brush 28 of this row. Therefore, should the lagging brush 30 engage a conductive segment a positive pulse will appear across the resistor 68 and between the output terminal 66 and ground. Since the transistor 60 is nonconductive, the leading brush 28 is ineffective and cannot be instrumental in producing a voltage at the output terminal 66 even if it is in contact with a conductive segment in its row.

For the reasons described above, should the lagging brush 30 engage a conductive segment in the row 20 to produce a positive voltage across the resistor 68, a ground potential will be introduced to the base of the transistor 64 to make the transistor nonconductive. This will cause a negative potential to be produced on the collector of the transistor 64 for introduction to the base of the transistor 74. This will make the lagging brush 34 in the row 18 effective rather than the leading brush 32.

If the effective lagging brush 34 engages a nonconductive segment in its row, there will be no current flow through the transistor 74 and the resistor 80 even though there is a negative potential on the base of the transistor. Because of the lack of current flow through the transistor 74, a negative potential is produced on the collector of the transistor 74 and on the base of the transistors 76 and 84. This negative potential causes the transistor 84 rather than the transistor 86 to become prepared for conductivity. This makes the leading brush 36 in the row 16 effective rather than the lagging brush 38.

It should be evident, therefore, that whenever the brush 26 engages a conductive segment in its row 22 on the disc 10, the lagging brush 30 in the row 20 is selected. Whenever the brush 26 engages a nonconductive segment in the row 22, the leading brush 28 in the row 20 is selected. Likewise, when the selected brush in the row 20 engages a conductive segment in that row the lagging brush 38 in the row 18 is selected, and when the selected brush in the row 20 engages a nonconductive segment the leading brush 36 in the row 18 is selected. The selection described in the previous paragraph continues throughout all the rows. In each instance, the selection of a brush in any one row is conditioned upon whether or not the selected brush in the preceding row engages a conductive or a nonconductive segment. In this manner, it is assured that only brushes are selected which are in positive engagement with the segments to be read in each row. This precludes the possibility of any false reading or any ambiguity.

The conductive segments of the first annular row 22 of the disc 10 cause a positive voltage to be produced at the output terminal 52 whenever they engage the brush 26. These voltages correspond to the least significant binary digit. Similarly, the conductive segments in the second row 20 of the disc cause a positive voltage to be produced whenever they engage the selected brush in that row, and these pulses are of the next higher digital significance. In like manner, positive voltages of increasing binary digital significance are produced at the output terminals 78, 90, 100 and 108 whenever a conductive segment in the corresponding annular rows on the disc 10 engages the selected brush of that row. It should be evident, therefore, that a series of voltages are produced across the output terminals which represent at any instant a multi-digital number corresponding to an analogue quantity. In this instance, the analogue quantity is the angular position of the disc 10.

The converter of the present invention is extremely rapid in its operation, as may be seen from the above description. This is because the digital information from the disc 10 is conveyed instantaneously to a plurality of output terminals over a corresponding plurality of parallel paths rather than successively to a single pair of output terminals. It should be noted that each time the brush 26 engages a conductive or a nonconductive segment in the row 22, the paths from the selected brush of each of the other rows is immediately established to its corresponding output terminal.

It will also be noted that the different segments in each row do not necessarily have to be conductive or non-conductive. For example, all of the area of a row such as the row 20 can be conductive and can be formed into first and second segments in which the second segments are depressed relative to the first segments. Because of the depressed relationship of the second segments, the brushes 28 and 30 contact only the first segments so as to produce electrical signals only when the selected one of the brushes is disposed in contiguous relationship to the first segments and not when it is disposed in contiguous relationship to the second segments. The terms "conductive" and "non-conductive" as used in the claims are intended to cover such equivalent arrangements as raised and depressed segments on the disc 10 or any other equivalent arrangements.

The invention provides, therefore, an analogue-to-digital converter which is not only simple and relatively inexpensive in its construction but which is extremely rapid and reliable in its operation.

What is claimed is:

1. An analog-to-digital converter comprising a binary coded member having a plurality of rows with alternate first and second segments in each row and each successive row representing a more significant digit, one readout element positioned to read said segments in the least significant digit row, a single pair of leading and lagging readout elements positioned to read said segments in each of the other rows, an individual output conductor for each of said rows, means connected to said one readout element for deriving a binary one on the output conductor from said least significant digit row when said first readout element is adjacent one of said segments and a binary zero output when said first readout element is adjacent an alternate segment, a three electrode electronic discharge control device having one electrode connected to said least significant digit output, a pair of three electrode electronic discharge control devices for each pair of readout elements with one electrode of each control device connected to its respective readout element and a second electrode of each control device connected to the common output conductor for the particular row, a third electrode of one of the first pair of control devices being connected to said least significant digit output and said one electrode of the first control device, and a third electrode of the other of said first pair of control devices being connected to a second electrode of said first control device, whereby said one of said pair of control devices is activated when the least significant digit is a binary zero to select a leading readout element and the other of said pair of control devices is activated when the least significant digit is a binary one to select a lagging readout element.

2. An analog-to-digital converter comprising a binary coded member having a plurality of rows with alternate first and second segments in each row and each successive row representing a more significant digit, one readout element positioned to read said segments in the least significant digit row, a pair of leading and lagging readout element positioned to read said segments in each of the other rows, an individual output conductor for each of said rows, means connected to said readout elements for deriving a binary one output on the corresponding conductor when a selected readout element is adjacent one of said segments and a binary zero output when said readout element is adjacent an alternate segment, including a three electrode electronic discharge control device having one input electrode connected to said least significant digit readout element and to one of said output conductors, a plurality of three electrode electronic discharge control devices for each pair of readout elements with two of said control devices each having one input electrode connected to its respective readout element and a second electrode connected to the common output conductor for the particular row, an input electrode of one of said pair of control devices being connected to a previous one of said output conductors, and an input electrode of the other of said pair of control devices being connected to an output electrode from a previous control device, whereby a leading readout element is selected when the previous output is a binary zero and a lagging readout element is selected when the previous output is a binary one.

3. An analog-to-digital converter comprising a binary coded member having a plurality of rows with alternate first and second segments in each row and each successive row representing a more significant digit, one readout element positioned to read said segments in the least significant digit row, a pair of spaced readout elements positioned to read said segments in each of the other rows, an individual output conductor for each of said rows, means connected to said one readout element for deriving a binary output on the output conductor from said least significant digit row, a three electrode semi-conductor control device having one electrode connected to said least significant digit output, and a pair of three electrode semi-conductor control devices for each pair of readout elements with an input electrode of each control device connected to its respective readout element and an output electrode of each control device connected to the common output conductor for the particular row, an input electrode of each of said pairs of control devices being connected to a previous one of said output conductors.

4. An analog-to-digital converter including a binary coded information member having a plurality of first and second segments arranged in rows, the first segments in each row being alternately disposed relative to the second segments in the row, the first and second segments in each row having an increased length of a particular ratio relative to the first and second segments in the preceding row, a plurality of receiving means, particular receiving means in the plurality being paired, each pair of receiving means being disposed in electrical proximity to the first and second segments in a different row, a plurality of semi-conductors each having first and second input electrodes and an output electrode, the semi-conductors being arranged in groups having first, second and third semi-conductors, the first input electrodes of the second and third semi-conductors in each group being connected to receive the signals from the receiving means in a different pair and the output electrodes of the second and third semi-conductors being connected together to provide output signals representing the disposition of the receiving means relative to the segments in the associated row, the second input electrode of the first semi-conductor in each group being connected to receive the signals from the output electrodes of the second and third semi-conductors in the preceding group and being further connected to the second electrode of the second semi-conductor in the group and the output electrode of the first semi-conductor in the group being connected to the second input electrode of the third semi-conductors in the group for an activation of one of the paired receiving means associated with the group in accordance with the output signals from the second and third semi-conductors in the preceding group and for the production of output signals from the second and third semi-conductors in the group in accordance with the disposition of the activated receiving means wtih respect to the segments in the associated row.

5. An analog-to-digital converter including a binary coded information member having a plurality of first and second segments arranged in rows, the first segments in each row being alternately disposed relative to the second segments in the row, the first and second segments in each row being substantially twice as long as the first and second segments in the preceding row, a plurality of receiving means, particular receiving means in the plurality of being paired, each pair of receiving means being disposed in electrical proximity to the first and second segments in a different row, a plurality of semi-conductors each having electrodes equivalent to an emitter, a base and a collector, the semi-conductors being arranged in groups having first, second and third semi-conductors, the emitters of the second and third semi-conductors in each group being connected to receive the signals from an individual one of the receiving means in a different pair and the collectors of the second and third semi-conductors being connected together to provide output signals representing the disposition of one of the receiving means relative to the segments in the associated row, the base of the first semi-conductor in each group being connected to receive the signals from the collectors of the second and third semi-conductors in the preceding group and being further connected to the base of the second semi-conductor in the group and the collector of the first semi-conductor being connected to the base of the third semi-conductor in the group for an activation of one of the paired receiving means associated with the group in accordance with the output signals from the second and third semi-conductors in the preceding group and for the production of output signals from the second and third semi-conductors in accordance with the disposition of the activated receiving means with respect to the segments in the associated row.

6. In an analog-to-digital converter including a binary information member having alternate conductive and nonconductive segments disposed in rows of different ordinal significance, a first electrical contact brush engaging the conductive and nonconductive segments in the row of lowest ordinal significance, and a plurality of pairs of electrical contact brushes respectively engaging the conductive and nonconductive segments in succeeding ones of said rows, the combination of a logical control circuit including a first control transistor connected to said first brush with the conduction of said transistor being controlled by the contacting of said first brush with said conductive and nonconductive segments, a plurality of further control circuits each including a pair of transistors connected to the respective pairs of contact brushes in the succeeding rows, connections from said first control transistor to a succeeding one of said further control circuits to render one or the other of the transistors therein conductive as determined by the conductive state of said transistor in said first control circuit, successive connections between succeeding ones of said further control circuits to condition one or the other of the transistors in each such circuits for conduction as determined by the conductive state of the transistors in the preceding circuit, and a plurality of output terminals respectively connected to said control circuits to be selectively and respectively connected by the conductive transistors therein to a selected brush from each of said pairs.

References Cited in the file of this patent

UNITED STATES PATENTS

| | | |
|---|---|---|
| 2,496,585 | Harper | Feb. 7, 1950 |
| 2,666,912 | Gow | Jan. 19, 1954 |
| 2,713,680 | Ackerlind | July 19, 1955 |
| 2,750,584 | Goldfischer | June 12, 1956 |
| 2,754,502 | Dickinson | July 10, 1956 |
| 2,763,832 | Shockley | Sept. 18, 1956 |
| 2,770,734 | Reek | Nov. 13, 1956 |
| 2,774,888 | Trousdale | Dec. 18, 1956 |
| 2,810,081 | Elliott | Oct. 15, 1957 |
| 2,816,238 | Elliott | Dec. 10, 1957 |
| 2,835,829 | Sourgens et al. | May 20, 1958 |
| 2,866,184 | Gray | Dec. 23, 1958 |
| 2,868,455 | Bruce et al. | Jan. 13, 1959 |
| 2,873,440 | Speller | Feb. 10, 1959 |

OTHER REFERENCES

"Transistors, a New Class of Relays," Control Engineering, Dec. 1956, pp. 70–76.